United States Patent
Muehlpforte et al.

(10) Patent No.: US 6,705,660 B2
(45) Date of Patent: Mar. 16, 2004

(54) WINDSHIELD WIPER ASSEMBLY

(75) Inventors: Kurt Muehlpforte, Buehl (DE); Jan Dietrich, Buehl (DE); Peter Kalchschmidt, Bruchsal-Untergromb (DE); Claus Fleischer, Buehl (DE); Tino Boos, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/235,093

(22) Filed: Sep. 5, 2002

(65) Prior Publication Data

US 2003/0042750 A1 Mar. 6, 2003

(30) Foreign Application Priority Data

Sep. 6, 2001  (DE) .......................... 101 43 610

(51) Int. Cl.⁷ .................................................. B60J 1/02
(52) U.S. Cl. ................. 296/96.15; 15/250.001
(58) Field of Search ................ 296/96.15; 15/250.001, 15/250.11

(56) References Cited

U.S. PATENT DOCUMENTS

| 3,448,480 A | * | 6/1969 | Couget .................. 15/250.001 |
| 4,973,212 A | * | 11/1990 | Jacobs .......................... 24/453 |
| 5,101,531 A | * | 4/1992 | Edwards et al. ......... 15/250.16 |
| 5,495,637 A | * | 3/1996 | Egner-Walter ........... 296/96.15 |

FOREIGN PATENT DOCUMENTS

| DE | 004337104 A1 | * | 5/1994 | ............ 15/250.001 |
| DE | 198 29 320 A1 | | 1/2000 | |
| DE | 199 25 291 A1 | | 12/2000 | |

* cited by examiner

*Primary Examiner*—D. Glenn Dayoan
*Assistant Examiner*—Lori L Coletta
(74) *Attorney, Agent, or Firm*—Michael J. Striker

(57) ABSTRACT

A wiper assembly is attached at several positions to a motor vehicle body by means of a plate bar (10). The plate bar (10) is attached by means of at least one snap element (20, 26; 32, 36; 32, 38; 34, 40).

11 Claims, 6 Drawing Sheets

WINDSHIELD WIPER ASSEMBLY

BACKGROUND OF THE INVENTION

The present invention relates generally to a windshield wiper assembly.

Wiper assemblies for motor vehicles are secured to the vehicle body with a wiper support, a so-called plate bar, or a plate bar tube, when the wiper support contains elements made from tubes. The plate bar includes a motor plate bar, which supports a wiper drive with a wiper motor and a drive formed thereon.

Drive shafts of the windshield wiper are supported in wiper bearings, whose bearing housings are fastened to or formed on the ends of the plate bar. The plate bar is directly fastened to an automobile body with screws by means of the bearing housing or via mounting eyes or bosses formed on the plate bar and/or motor plate bar. In practice, the plate bars are made up of many components together. This leads to numerous interfaces with corresponding tolerances. In addition, attachment by means of screws is expensive, and the assembly costs are high.

In DE 198 29 320 A1, the above type of tubular plate bar is disclosed, which is screwed to the vehicle body by means of four attachment bosses.

In some cases, the wiper bearing is attached directly to the automobile body. This type of wiper bearing, which is attached to a front wall, is disclosed in DE 199 25 291 A1. The bearing housing of the wiper bearing has three support areas, a first one of which surrounds a longitudinal axis of the bearing housing. Second and third support areas are provided relative to the first, axially placed to the other end and are arranged relative to one another approximately diametrically to the longitudinal axis of the bearing housing. The first support area is formed by a flange, while the second and third support areas are formed as plug feet, which engage in pockets on the front wall. The support of the wiper bearing is fixed by means of a screwed nut, which is screwed on a threaded area on the bearing housing and presses a flange of the bearing housing against a holding angle. With this type of attachment variation, the assembly also is expensive, as the wiper bearings are attached individually.

SUMMARY OF THE INVENTION

According to the present invention, the plate bar is attached by means of at least one snap element. The snap element can be an elastic, flexible clamp with a ring-shaped receiving seat, which is open over a part of its periphery. A corresponding fitting piece of the plate bar is pressed in the receiving seat and held by the clamp. An assembly of the plate bar is simple, since additional components, such as screws or screw nuts, are not used. In addition to this savings on materials, the use of relatively expensive screw connections as attachment elements on the plate bar and vehicle body can be avoided, which reduces manufacturing expenses. Without the screw processes, the assembly time is shortened.

On the plate bar tube, the clamps are arranged appropriately in the region of the wiper bearing, whereby many variations are possible. The clamps require relatively little construction space, and for assembly, little free space. They can engage the plate bar tube in the direction of the longitudinal axis outside or inside the wiper support, so that different placement relationships can be considered in a simple manner. If the clamps lie between the wiper bearing, the plate bar tube can end at the bearing housing, thereby providing a short plate bar tube and a light plate bar.

The clamps also can engage the plate bar tube about the periphery with reference to various directions, thereby providing additional assembly variations. In order to save manufacturing costs, a form of the plate bar tube can be standardized by means of a determined number of attachment positions, so that the tubular plate bar can be used in the most number of vehicle types as possible. In addition, existing tolerances of a previously mounted plate bar can be equalized without problems by means of the snap connection, since these snap connections do not need to be as accurately placed as screw connections. In this regard, smaller tolerance requirements on the individual components exist, so that further manufacturing costs are saved.

Preferably, the clamp is connected at the outer periphery to the vehicle body, whereby the number of parts, likewise, is reduced. Depending on the space proportions, the clamp can comprise directly a part of the body sheet and be formed or soldered, riveted, or clipped on the auto body. In the assembly, the plate bar simply is pressed into the clamp, whereby eventual small subsequent readjustments are possible. This simple assembly is also advantageous in the case of repairs, since components to be replaced can be removed quickly.

In one embodiment of the invention, a support is mounted on the vehicle body, which on its free ends has the shape of a half-shell, in which the corresponding fitted part of the plate bar is inserted. The clamp is moveable and can be pressed by hand or with the aid of a device over the half-shell and the fitted part, for example, the plate bar tube, whereby advantageously, various mounting directions are possible. The previously-mounted plate bar can be oriented in the assembly before it is fixed by the clamp.

In order to achieve a connection with low oscillation, the clamp or the fitted part of the plate bar is surrounded by an elastic insulating material, preferably rubber. The decoupling element is premounted as a component. Alternatively, the element in the receiving seat of the clamp or on the fitted part of the plate bar is injection-molded, thereby reducing the number of parts. Also, in this case, the assembly time is shortened, and sources of error, for example, incorrect placement or tilted components, are eliminated.

In practice, the receiving seat of the clamp and the fitted part have a circular cross-section, so that the plate bar rotates about the tubular axis and can be oriented. However, it is also advantageous if the cross section has a shape other than that of a circle, for example, an elliptical or polygonal shape. In this manner, a form-lock between the clamp and the fitted part is achieved, so that rotational moment can be overcome.

In the above-described variations of the invention, the fitted part and the clamp are mounted under the effect of force. If the connections are to be loosened, a further form of the invention provides that the ring-shaped cross-section of the fitted part has two opposite level or smooth areas with a distance between them that is smaller than the assembly slot of the clamp. The fitted part fits without or with a smaller force with the smooth cross section side through the assembly slot and after joining, is interlocked through a rotational movement of about 90°. In addition, a pressing between the clamp and the fitted part can be achieved by means of a minimal, smooth shape transverse to the assembly slot upon the rotational movement with minimal force.

In a further form of the present invention, an attachment element is arranged fixedly on the body of the vehicle. A head is formed on a free end of the attachment element. A corresponding counterpiece that is connected with the plate bar is pressed onto this and engages there. The counterpiece is an uncoupling element, which upon manufacture of the plate bar is injected and placed in the plate bar. The head and the counterpiece can be so formed that they allow various degrees of freedom for various orientations for the plate bar.

With a first form and second form, the head is spherical or ball-shaped. It is supported in a spherical seat so that It has three degrees of freedom, and it can be guided in two opposite guide grooves of a longitudinal groove, so that it still has a translatory degree of freedom to the three rotatable degrees of freedom. The head of the attachment element can also have two parallel support surfaces and can be guided between a front surface and a support surface of the counterpiece. In this manner, the attachment element can be oriented in a universal plane within a distance between an outer peripheral surface of its head and an inner peripheral surface of a receiving chamber of the counterpiece, or within a free space between the attachment element and the counterpiece, so that it provides two translatory degrees of freedom in the provided limits. Additional structure variations exist when the various forms of connection are combined with another upon construction of the plate bar.

DETAILED DESCRIPTION OF THE PREFERRED EMBODIMENTS

Figure 1:
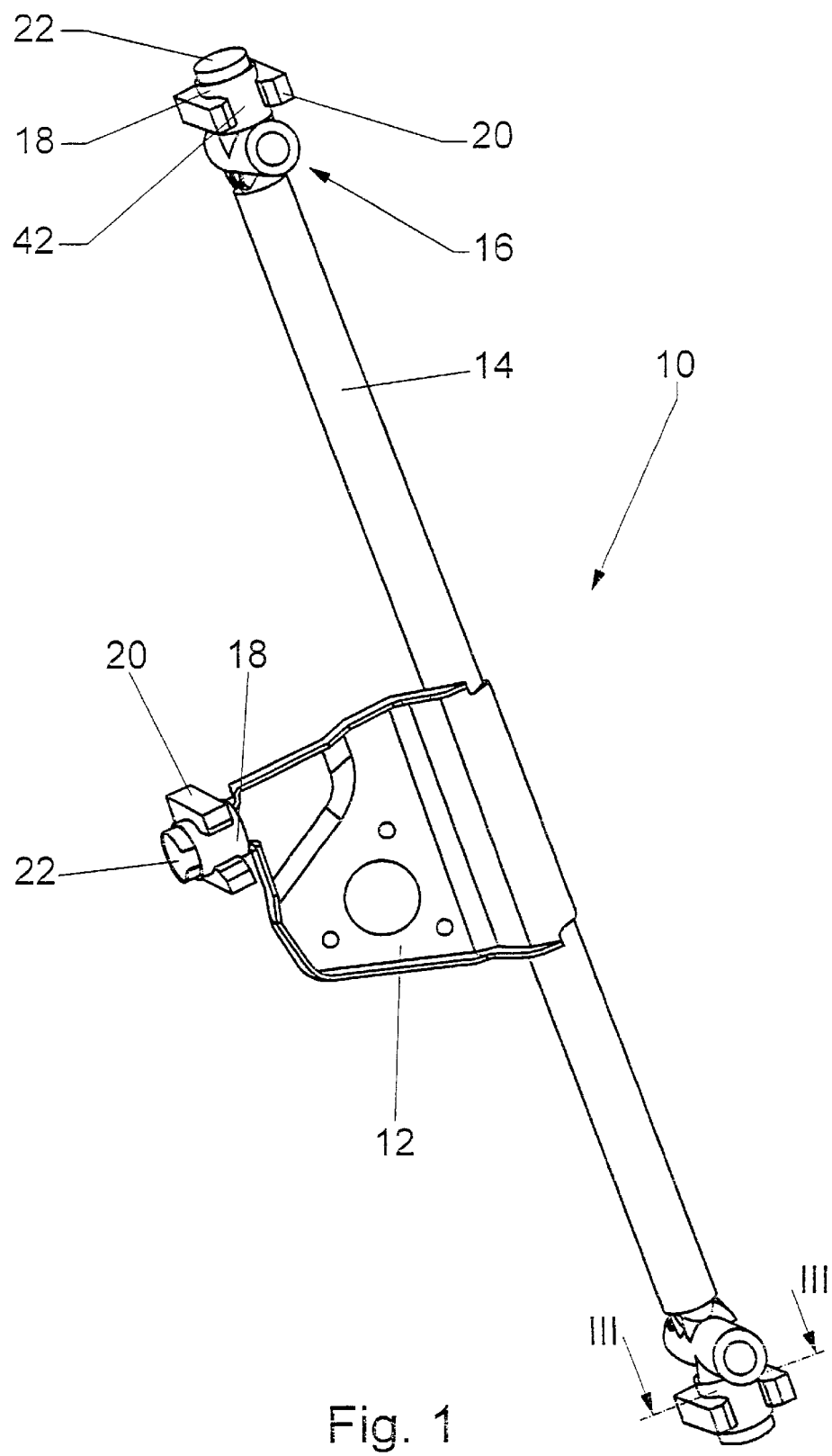
FIG. 1 shows a perspective representation of a plate bar.

A plate bar 10 includes a plate bar tube 14, on which a plate, serving as a motor plate bar 12, is arranged in a middle region (FIG. 1). On the respective ends of the plate bar tube 14, a wiper support 16 is disposed, on the exterior of which a cylindrical fitted part 22 is formed. On free ends of the motor plate bar 12, a further fitted part 22 is arranged. The fitted part 22 is made from die cast metal, such as aluminum, zinc, or a suitable alloy, from injection molding, or from a sheet, or it can be a component of the plate bar tube 14. They are surrounded with decoupling elements 18, which prevent or dampen the transmission of oscillation of the plate bar 10 on a vehicle body (not specifically shown), on which the plate bar 10 is secured. The decoupling elements 18 are made from a rubber-elastic material. They can be placed in the adjoining components or inserted on these or can be injected.

The three fitted parts 22 on the attachment positions are respectively pressed through a mounting slot 42 of a snap element in the shape of a clamp 20, which preferably comprises an elastic, bendable material, for example, plastic or a spring construction from metal, and in the mounted state, the fitted part 22 engages so that the fitted part 22, at its periphery, is held under interposition of the decoupling element 18 in a receiving seat 44 of the clamp 20 with biasing. The clamps 20 are secured with a smooth part 78 on its periphery to the vehicle body by soldering, rivets, clips, and so on, whereby the assembly slot 42 is so oriented that the fitted part 22 of the plate bar 10 simply can be pressed into the clamps 20. They also can be formed directly from the body sheet, thereby saving material and assembly costs.

Figure 2:
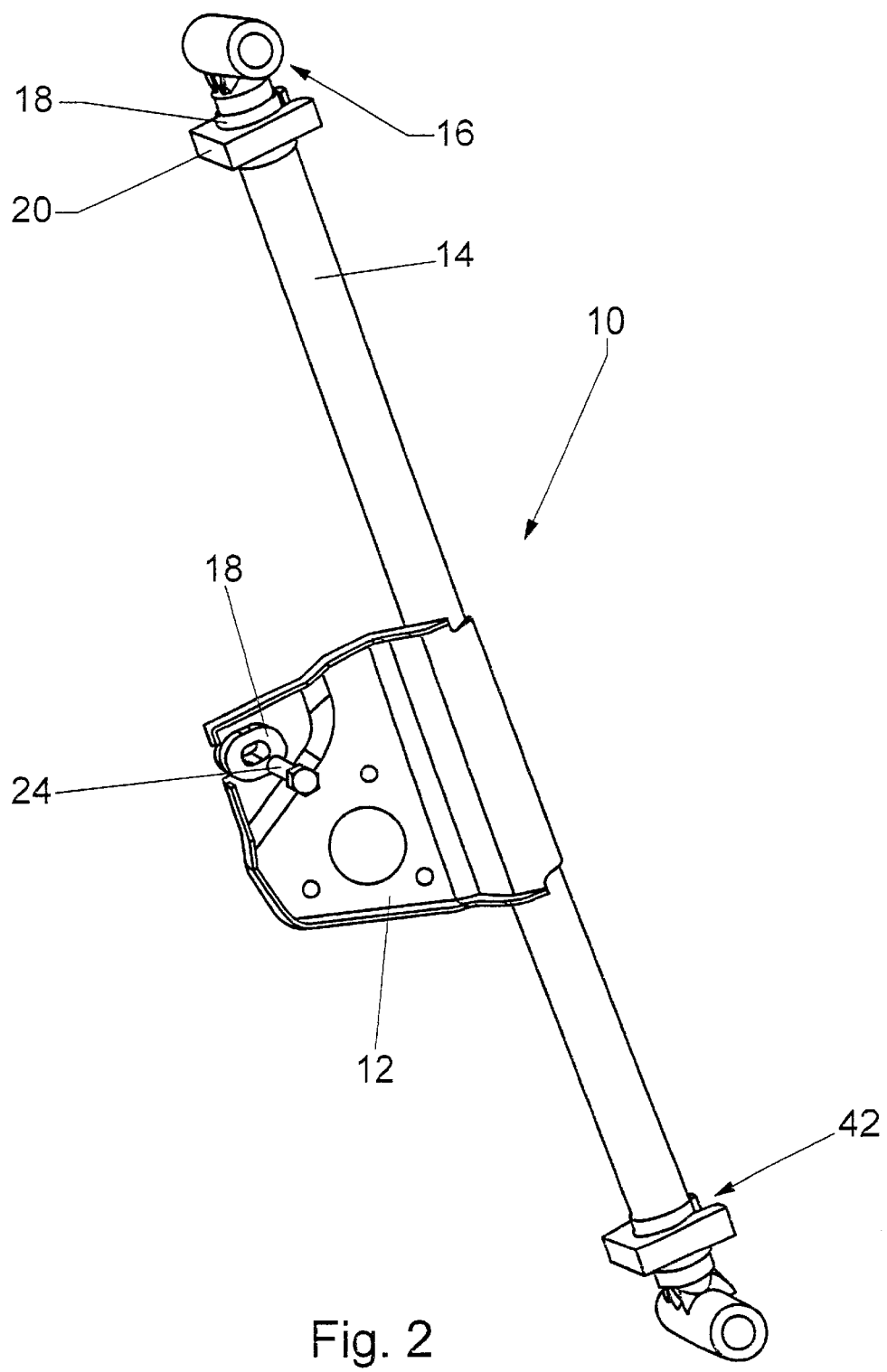
FIG. 2 shows a variation of FIG. 1.

It is not required that all of the attachment elements are snap elements. FIG. 2 shows an attachment by means of a screw 24 to the motor plate bar 12 and clamps 20 in the area of the wiper support 16. The attachment position on the motor plate bar 12 is a fixed point, while the plate bar tube 14 can be adjusted at the attachment position in the area of the wiper support 16 and can pivot about its longitudinal axis. In addition, the position of the clamps 20 with reference to the wiper support 16 can be varied. In the embodiment shown in FIG. 1, the fitted parts 22 and the clamps 20 are arranged outwardly on the wiper support 16, while in the embodiment shown in FIG. 2, the clamps 20 are disposed between the motor plate bar 12 and the wiper support 16 and the plate bar tube 14 itself serves as a fitted part, whereby in addition, the assembly slot 42 of the clamp 20 runs approximately parallel to the motor plate bar 12. By this arrangement, the plate bar tube 14 can be shortened. The plate bar 10, then, is more compact and at the same time, uses fewer materials. For assembly, the plate bar tube 14 is first pressed into the clamps 20 and then, the motor plate bar 12 is secured upon interposition of a decoupling element 18 by means of the screw 24.

Figure 3:
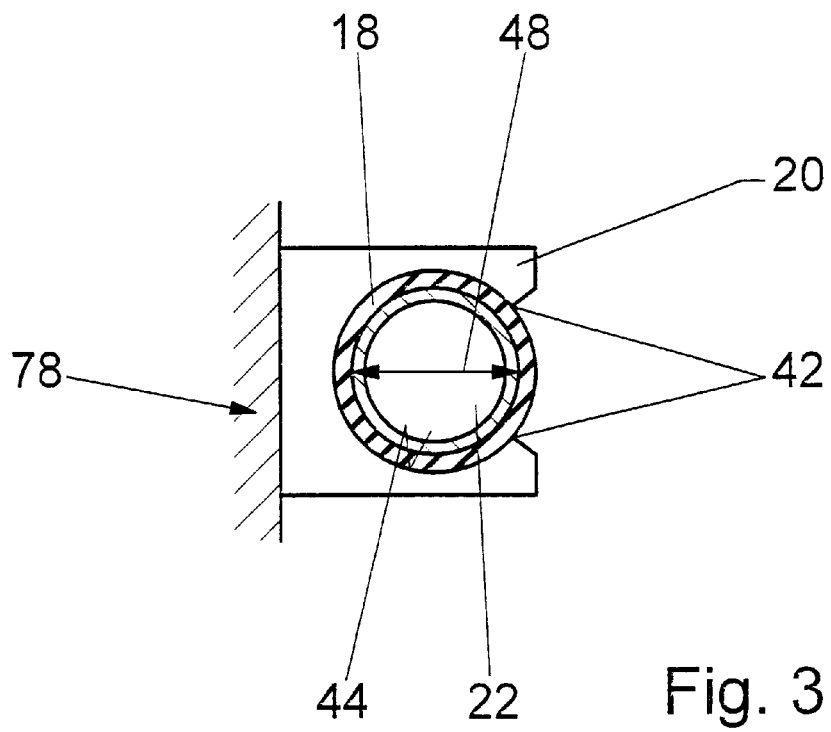
FIG. 3 shows a section through a fixed clamp, corresponding to the lines III—III in FIG. 1.
Figure 4:
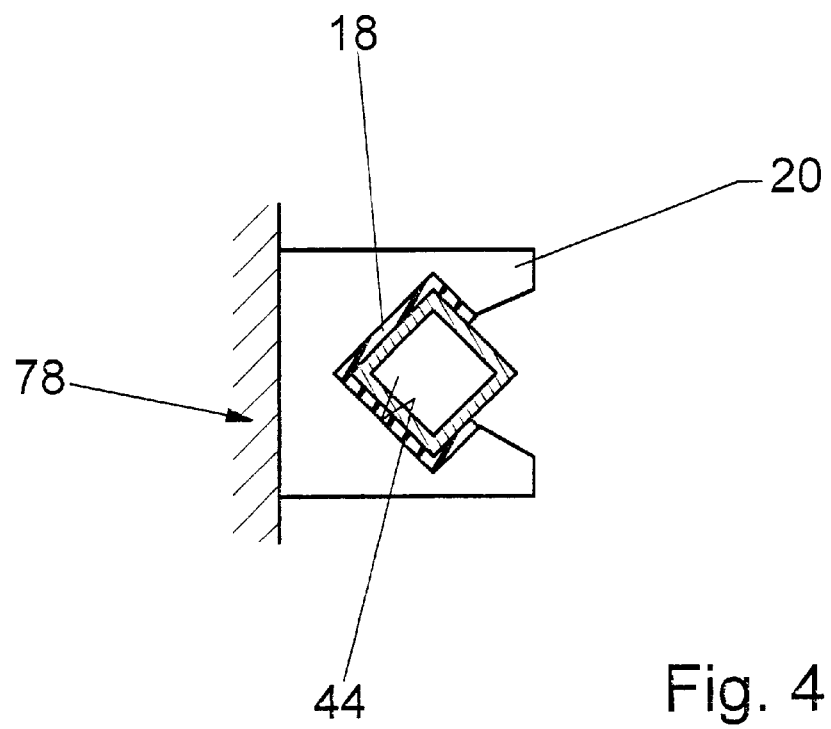
FIG. 4 shows a variation of FIG. 3.

The section shown in FIG. 3 illustrates how the fitted part 22 is mounted in an approaching ring-shaped receiving seat 44 of the clamp 20 under interposition of the decoupling element 18. The decoupling element 18 can be inserted on the fitted part 22 or can be injected, and it is pressed together with the fitted part 22 through the assembly slot 42. In this manner, the diameter 48 of the fitted part 22 is determined based on the width of the assembly slot, so that the decoupling element 18 and the clamp 20 elastically deflect and the fitted part 22 finally engages in the receiving seat 44. With this embodiment, the fitted part 22 and the receiving seat 44 have a circular cross section. It is also contemplated that other cross-sectional shapes can be used, such as, for example, elliptical or polygonal cross sections. FIG. 4 shows, for example, a squared cross-section when the plate bar tube 14 is a squared tube and serves as the fitted part. In addition, according to the embodiment of FIG. 4, the decoupling element is mounted on the receiving seat 44 of the clamp 20.

Figure 5:
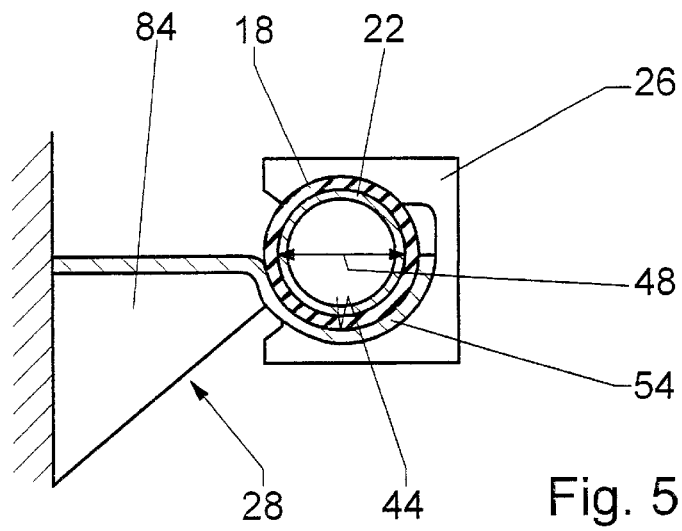
FIG. 5 shows a cross section through a support on a motor vehicle body and a loosened clamp.

In the embodiment of FIG. 5, a support 28 is attached to the vehicle body. It has the shape of a half-shell 54 on the outer ends of an attachment part 84. The ring-shaped fitted part 22 is inserted or embedded into the half-shell 54. For attachment, a loosened clamp 26 is clipped over the fitted part 22 and the half-shell. Between the receiving seat 44 of the clamp 26 and the half-shell 54 on one side and the fitted part 22 on the other side, a decoupling element 18 is provided that is connected with the fitted part 22 in an appropriate manner.

Figure 6:
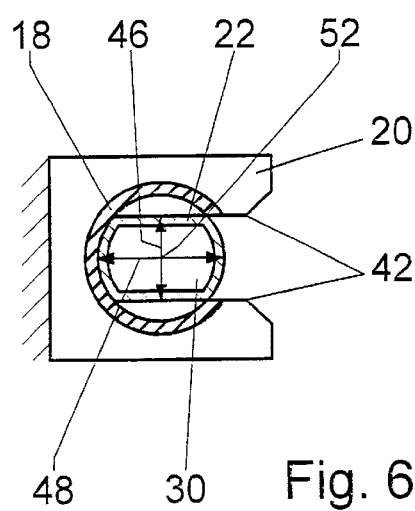
FIGS. 6 and 7 shows a variation of FIG. 4.
Figure 7:
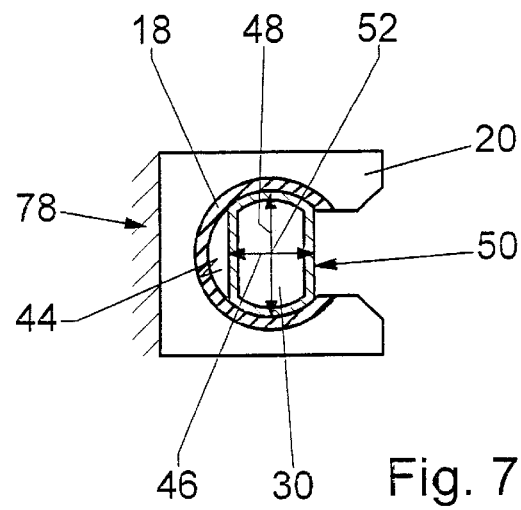

In another embodiment, a similar force-free assembly is possible. The fitted part 30 has two opposite smoothed regions arranged at a distance 46 from one another (FIG. 6), whereby the distance 46 is smaller than the width of the assembly slot 42, so mat the fitted part 30 has a narrower cross sectional side and can be connected without or with only a minimal pressure through the assembly slot 42 in the clamp 20. After mounting, the fitted part 30 can be locked or engaged in the ring-shaped receiving seat 44 by means of rotational movement of about 90° about the rotational axis 52 (FIG. 7). The receiving seat 44, in the locked position of the fitted part 20, can be slightly smaller than the diameter 48 of the fitted part 20, so that upon rotational movement with minimal rotational force, a desired biasing can be obtained, permitting a play-free connection.

Figure 8:
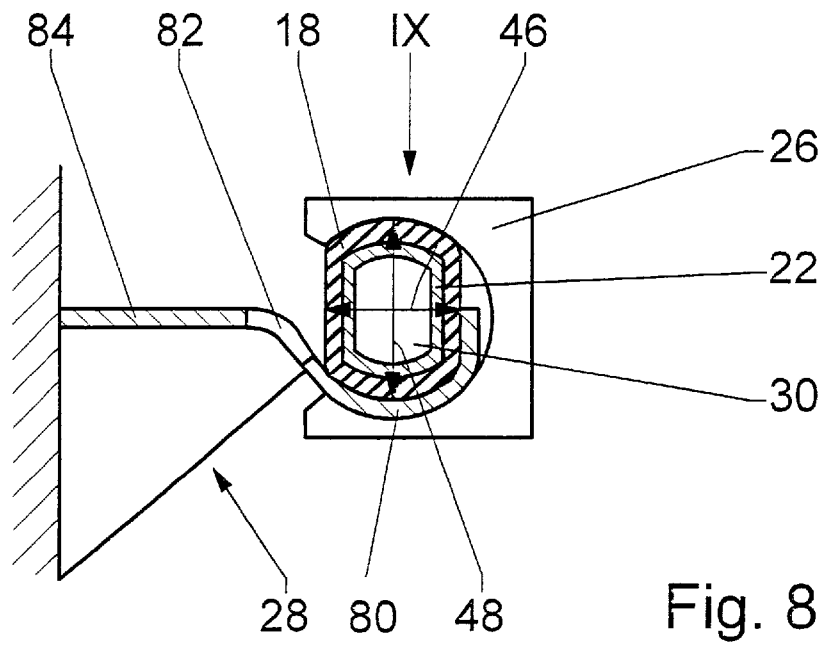
FIG. 8 shows a variation of FIG. 5.
Figure 9:
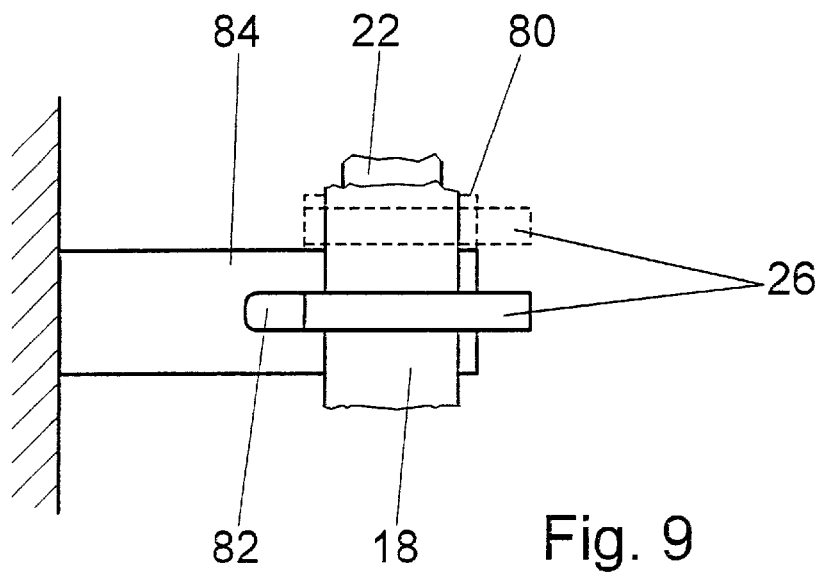
FIG. 9 shows a view in the direction of arrow IX in FIG. 8.

Also, loose clamps 26, as shown in the embodiment of FIG. 5, can be mounted according to this principle (FIG. 8). The decoupling element 18 surrounds the fitted part 30 in this variation, which is considered upon determination of the distance 46. For attachment, the clamp 26 is shifted with its assembly slot 42 from a narrow side over the fitted part 22 and the half-shell 80. In this manner, a leg of the clamp 26 is guided through an opening 82 in the support 28. It is also possible that the half-shell 80 is extended over an attachment part 84 in the longitudinal direction of the fitted part 22, so that the clamp 26 can be freely, rotatably mounted transverse to the attachment part 84, as shown in FIG. 9 in dashed lines.

According to a further embodiment (FIG. 10), the snap element comprises an attachment part 32 that is secured to the body and has a spherical head 56. This is pressed through a minimally narrow opening of a counterpiece 36 in a spherical seat 60 and engages there. The spherical seat 60 encompasses the spherical head 56 with a light press-seating so that the counterpiece 36 has three rotational degrees of freedom in a limited periphery. The counterpiece 36, by interposition of a decoupling element 18, is inserted into an opening of the plate bar, for example, in the area of the wiper support 16 or the motor plate bar 12.

Figure 10:
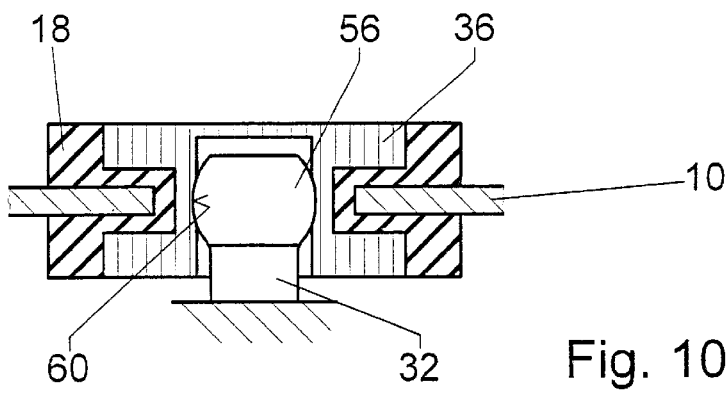
FIG. 10 shows a sectional representation of an attachment element with a counterpiece.
Figure 11:
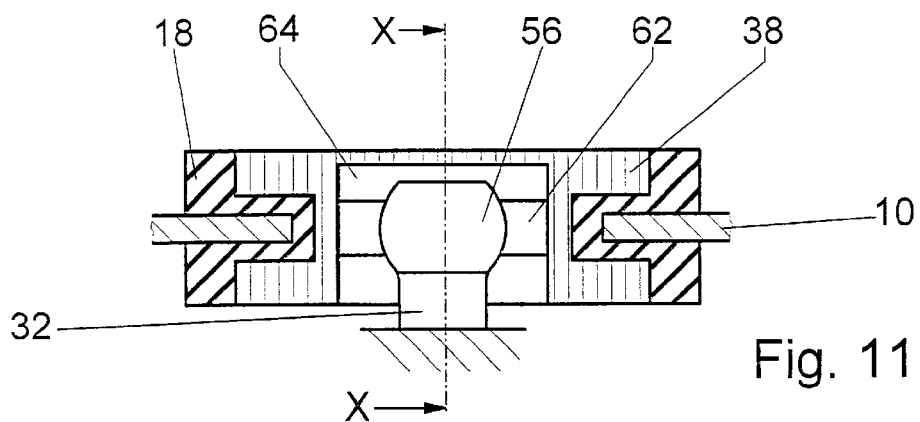
FIGS. 11–12 shows variations of FIG. 10.

According to a variation shown in FIG. 11, the spherical head 56 of the attachment element 32 is pressed through an opening of a counterpiece 38 into two opposite guide grooves 62 of a longitudinal guide 64 and engages there. The counterpiece 38, which is inserted in a similar manner as the counterpiece 36 of FIG. 10 is inserted into the plate bar 10, includes a translatory degree of freedom in the direction of the guide grooves 62 relative to the attachment part 32 near the three noted rotary degrees of freedom. FIG. 10 can also be interpreted as a section corresponding to lines X—X in FIG. 11.

Figure 12:
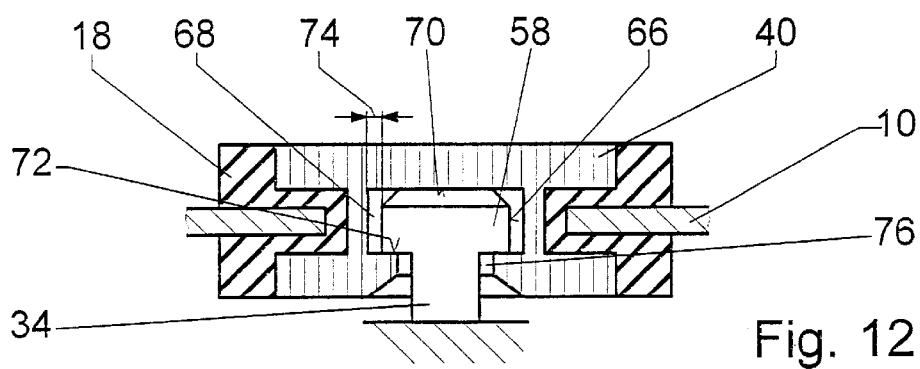

The embodiment of FIG. 12 includes an attachment element 34 with a flat spherical head 58, which is guided between a front surface 70 and a support surface 72 of a receiving chamber 68 of a counterpiece 40. The receiving chamber 68 has a distance 74 to the peripheral surface 66 of the head 58, while the remaining part of the attachment element 34 projects with a space 76 through an opening of the counter piece 40. The head 58 and the opening of the counterpiece 40 have a slanted projection for easier assembly, so that the head 58 can be pressed with a sufficient pressure through the opening into the receiving chamber of the counterpiece 40 and engages there. The connection produced in this manner has a rotary degree of freedom and within the distance 74, or space 76, two translatory degrees of freedom in a place, which is determined by the front surface 70 and the support surface 72.

The snap elements, in the form of a clamp 20 or in the form of the attachment elements 32, 34 in connection with the counterpieces 36, 38, 40 can be combined with one another at the various attachment positions in the area of the wiper support 16 and the motor plate bar 12 and can include screw connections according the actual construction situation.

It will be understood that each of the elements described above, or two or more together, may also find a useful application in other types of constructions differing from the types described above.

While the invention has been illustrated and described herein as a windshield wiper assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper assembly, said windshield wiper assembly is attached to a motor vehicle body at several positions by means of a plate bar (10), characterized in that the plate bar (10) is attached by means of at least one snap element (20, 26; 32, 36; 32, 38; 34, 40), wherein the at least one snap element (20, 26) is a clamp with a ring-shaped receiving seat (44), wherein said receiving seat (44) is open at a part of its periphery such that a fitted part (22) of said plate bar (10) corresponding to said receiving seat (44) can be pressed into said receiving seat (44) and is held by the clamp (20, 26).

2. The windshield wiper assembly as defined in claim 1, wherein the fitted part (22) is formed as a piece from a plate bar tube (14) between wiper supports (16).

3. The windshield wiper assembly as defined in claim 1, wherein the clamp (20, 26) comprises an elastic, deformable material.

4. The windshield wiper assembly as defined in claim 1, wherein the clamp (20, 26) or the fitted part (22) is surrounded by an elastic insulation material.

5. The windshield wiper assembly as defined in claim 1, wherein the clamp (20) is connected at its outer periphery with the motor vehicle body.

6. The windshield wiper assembly as defined in claim 1, wherein the clamp (20) is formed as a part of a sheet of the motor vehicle body and is formed on the motor vehicle body.

7. The windshield wiper assembly as defined in claim 1, wherein the clamp is soldered, riveted, or clipped to the motor vehicle body.

8. The windshield wiper assembly as defined in claim 1, wherein a support (28) is fixedly mounted to the motor vehicle body, wherein said support (28) has a shape of a half-shell (54) on its free ends, wherein a corresponding fitted part (22) of the plate bar (10) is inserted into said half-shell (54), whereby the clamp (26) engages the fitted part (22) and the half-shell (54).

9. The windshield wiper assembly as defined in claim 1, wherein the receiving seat (44) and the fitted part (22) have a cross-sectional shape that is not circular.

10. The windshield wiper assembly as defined in claim 1, wherein the fitted part (30) has a ring-shaped cross section with two opposite smoothed areas (50), wherein said smoothed areas (50) are separated by a distance (46), wherein said distance (460) is smaller than a width of a mounting slot (42) of the clamp (20, 26) so that the fitted part (30) and the clamp (20, 26), after mounting, are interlocked by means of rotation at approximately 90° relative to one another about a rotational axis (52).

11. The windshield wiper assembly as defined in claim 1, wherein the plate bar (10) is attached to said vehicle body by combining a plurality of attachment means.

* * * * *